(12) United States Patent
Schroeder et al.

(10) Patent No.: US 11,390,201 B2
(45) Date of Patent: Jul. 19, 2022

(54) SEAT ASSEMBLY

(71) Applicant: Lear Corporation, Southfield, MI (US)

(72) Inventors: Carsten Schroeder, Sindelfingen (DE); Bernd Rager, Bissingen (DE); Norman Windham, Ginsheim-Gustavsburg (DE); Ingo Riede, Hochheim (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 17/025,063

(22) Filed: Sep. 18, 2020

(65) Prior Publication Data

US 2021/0094453 A1 Apr. 1, 2021

(30) Foreign Application Priority Data

Sep. 27, 2019 (DE) .......................... 102019214933.2

(51) Int. Cl.
*A47C 7/02* (2006.01)
*B60N 2/68* (2006.01)

(52) U.S. Cl.
CPC ............. *B60N 2/682* (2013.01); *B60N 2/686* (2013.01); *B60N 2205/30* (2013.01)

(58) Field of Classification Search
None
See application file for complete search history.

(56) References Cited

U.S. PATENT DOCUMENTS

| | | | | |
|---|---|---|---|---|
| 5,507,554 A | * | 4/1996 | Nakano | B60N 2/4235 297/216.13 |
| 5,575,533 A | * | 11/1996 | Glance | B60N 2/682 297/232 |
| 5,628,543 A | * | 5/1997 | Filipovich | B60R 5/006 297/113 |

(Continued)

FOREIGN PATENT DOCUMENTS

| | | |
|---|---|---|
| DE | 19882886 T1 | 4/2001 |
| DE | 19959900 C2 | 12/2002 |

(Continued)

OTHER PUBLICATIONS

Office Action from German Patent Office for application 102019214933. 2, dated May 15, 2020, with English machine translation.

*Primary Examiner* — Shin H Kim
(74) *Attorney, Agent, or Firm* — Fishman Stewart PLLC (57) ABSTRACT

A seat assembly includes a first seatback and a second seatback. The first seatback may include a first seatback upper portion and a first seatback lower portion. The second seatback may include a second seatback upper portion and a second seatback lower portion. The seat assembly may further include an intermediate back section including an intermediate upper portion and an intermediate lower portion. The first seatback lower portion and the second seatback lower portion may be arranged on opposite sides of the intermediate lower portion. The seat assembly may also include a carrier frame to which the first seatback upper portion, the second seatback upper portion, and the inter- (Continued)

mediate upper portion may be connected. At least one of the first seatback upper portion, the second seatback lower portion, and the intermediate upper portion may be adjustably connected to the carrier frame.

20 Claims, 4 Drawing Sheets (56) References Cited

U.S. PATENT DOCUMENTS

| | | | |
|---|---|---|---|
| 5,645,316 A * | 7/1997 | Aufrere | B60N 2/2222 297/216.13 |
| 5,806,931 A * | 9/1998 | Kogai | A47C 7/4454 297/301.3 |
| 5,921,605 A | 7/1999 | Musukula et al. | |
| 6,082,823 A * | 7/2000 | Aumont | B60N 2/2222 297/216.13 |
| 6,199,252 B1 | 3/2001 | Masters et al. | |
| 6,286,902 B1 * | 9/2001 | Yoshimura | A47C 7/40 297/452.18 |
| 6,347,836 B1 * | 2/2002 | Hayotte | B60N 2/20 297/378.1 |
| 6,352,311 B1 * | 3/2002 | Hayotte | B60N 2/682 29/421.1 |
| 6,742,847 B2 * | 6/2004 | Yanai | B60N 2/3013 297/216.13 |
| 6,749,266 B2 * | 6/2004 | Williamson | B64D 11/0638 297/452.2 |
| 7,716,797 B2 * | 5/2010 | Kismarton | B64D 11/06 29/91.1 |
| 7,753,443 B2 * | 7/2010 | Uchida | B60N 2/4228 297/216.13 |
| 8,528,981 B2 * | 9/2013 | Funk | B60N 2/688 297/452.2 |
| 8,888,176 B2 * | 11/2014 | Kaku | B60N 2/682 297/216.13 |
| 8,931,850 B2 * | 1/2015 | Mitsuhashi | B60N 2/22 297/452.2 |
| 9,120,406 B2 * | 9/2015 | Sato | B60N 2/4228 |
| 9,145,075 B2 * | 9/2015 | Andersson | B60N 2/75 |
| 9,180,803 B2 * | 11/2015 | Cleary | B60N 3/14 |
| 9,227,541 B2 | 1/2016 | Hosbach et al. | |
| 9,365,143 B2 | 6/2016 | Sachs et al. | |
| 9,421,888 B2 * | 8/2016 | Kaneda | B60N 2/757 |
| 9,452,690 B2 | 9/2016 | Kamper | |
| 9,688,169 B2 * | 6/2017 | Contorbia | B60N 2/3013 |
| 10,035,442 B2 | 7/2018 | Kondrad et al. | |
| 10,493,885 B2 * | 12/2019 | Okuma | B60N 2/686 |
| 10,814,757 B2 * | 10/2020 | Hong | B60N 2/20 |
| 11,007,911 B2 * | 5/2021 | Yonehara | B60N 2/4221 |
| 2006/0103228 A1 * | 5/2006 | Gupta | B29C 49/4802 297/452.65 |
| 2007/0278842 A1 * | 12/2007 | Ikai | B60N 2/682 297/452.14 |
| 2008/0150341 A1 * | 6/2008 | Salewski | B60N 2/757 297/411.38 |
| 2010/0156128 A1 * | 6/2010 | Dexter | B60N 3/102 296/24.34 |
| 2010/0244502 A1 * | 9/2010 | Andersson | B60N 3/102 297/118 |
| 2013/0093226 A1 * | 4/2013 | Mitsuhashi | B60N 2/682 297/232 |
| 2013/0307310 A1 * | 11/2013 | Saada | B64D 11/0649 297/452.2 |
| 2015/0175038 A1 * | 6/2015 | Kaneda | B60N 2/6009 297/378.12 |
| 2017/0313223 A1 * | 11/2017 | Tomita | B60N 2/68 |
| 2018/0272907 A1 * | 9/2018 | Okuma | B60N 2/686 |
| 2020/0094714 A1 * | 3/2020 | Yonehara | B60N 2/686 |
| 2020/0171990 A1 * | 6/2020 | Hong | B60N 2/20 |

FOREIGN PATENT DOCUMENTS

| | | |
|---|---|---|
| DE | 102008018059 A1 | 11/2008 |
| DE | 102014220740 A1 | 4/2015 |
| DE | 202018102854 U1 | 8/2018 |
| FR | 2698832 A1 | 6/1994 |

* cited by examiner

FIG. 3C

SEAT ASSEMBLY

CROSS-REFERENCE TO RELATED APPLICATION

This application claims priority to German Application No. 10 2019 214 933.2 filed Sep. 27, 2019, the contents of which are hereby incorporated by reference in its entirety.

TECHNICAL FIELD

This application relates to a seat assembly that may be used in connection with a vehicle and a method for assembling such a seat assembly.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some seat assembly designs may be relatively complex, difficult to insert into a vehicle, and/or difficult to assemble. For example, some seat assemblies may include large components or elements that are not easy to manipulate and arrange properly within a vehicle such that all corresponding portions of the assembly are properly aligned and installed.

There is a desire for solutions/options that minimize or eliminate one or more challenges or shortcomings of the current seating assemblies. The foregoing discussion is intended only to illustrate examples of the present field and is not a disavowal of scope.

SUMMARY

In examples, a seat assembly is described. The seat assembly may include a first seatback and a second seatback. The first seatback may include a first seatback upper portion and/or a first seatback lower portion. The second seatback may include a second seatback upper portion and/or a second seatback lower portion. The seat assembly may include an intermediate back section that may include an intermediate upper portion and/or an intermediate lower portion. The first seatback lower portion and the second seatback lower portion may be arranged on opposite sides of the intermediate lower portion. The seat assembly may include a carrier frame to which the first seatback upper portion, the second seatback upper portion, and/or the intermediate upper portion may be connected. At least one of the first seatback upper portion, the second seatback lower portion, and/or the intermediate upper portion may be adjustably connected to the carrier frame.

With examples, a method of assembling a seat assembly may include connecting a first seatback upper portion, a second seatback upper portion, and/or an intermediate upper portion to a carrier frame such that the intermediate upper portion is disposed at least partially between the first seatback upper portion and the second seatback upper portion. The method may include substantially aligning the intermediate upper portion with an intermediate lower portion to form an intermediate back section, substantially aligning the first seatback upper portion with a first seatback lower portion to form a first seatback, and/or substantially aligning the second seatback upper portion with a second seatback lower portion to form a second seatback. At least one of the first seatback upper portion, the second seatback upper portion, and/or the intermediate upper portion may be adjustably connected to the carrier frame.

The foregoing and other potential aspects, features, details, utilities, and/or advantages of examples/embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Figure 1:
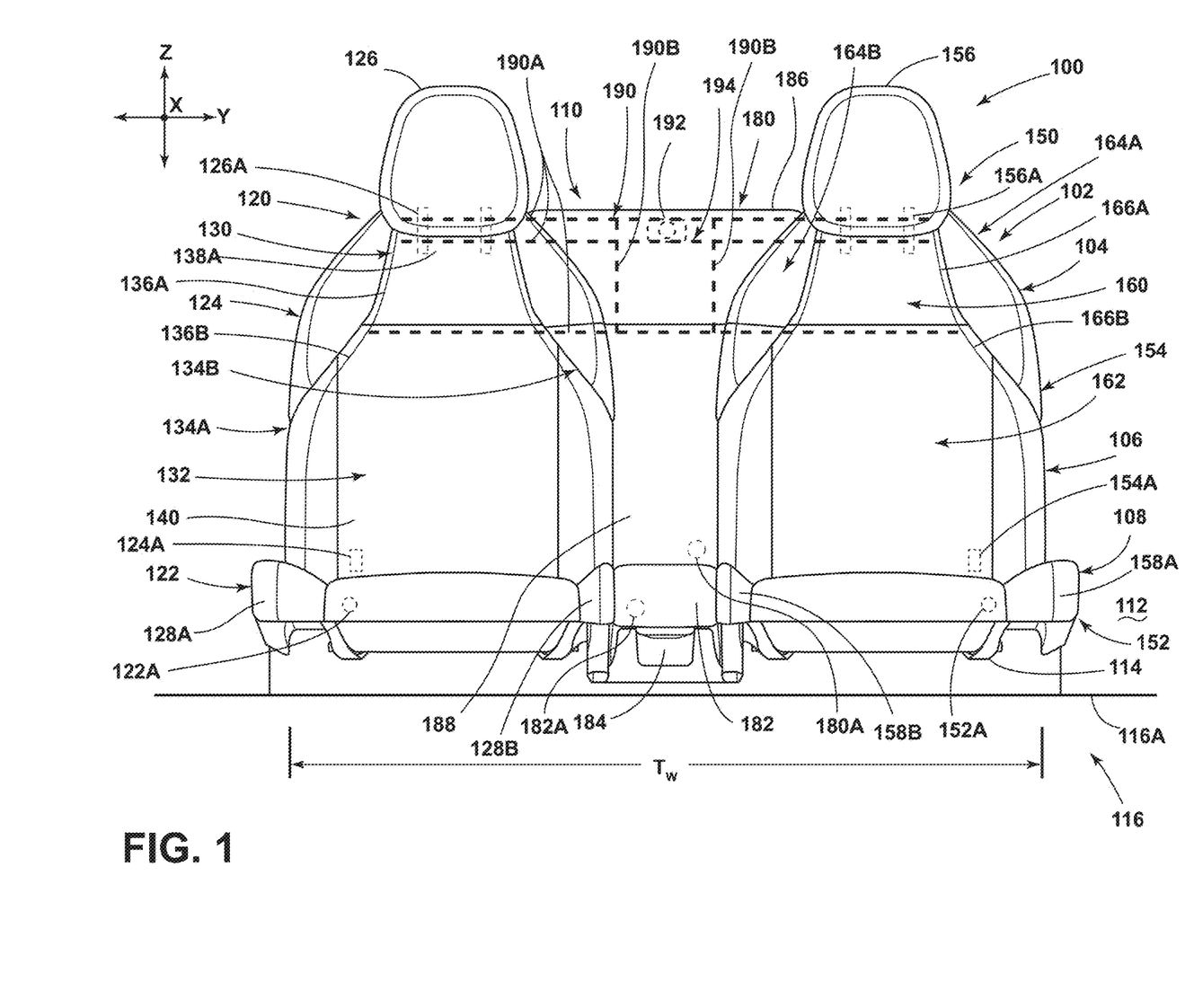
FIG. 1 generally illustrates an embodiment of a seat assembly according to teachings of the present disclosure.

With embodiments, such as illustrated in FIG. 1, a seat assembly 100 may be configured as a modular seat assembly that may include a plurality of components, elements, parts, etc. which, when assembled, may form a rear seat assembly or back seat assembly, such as for a passenger vehicle 116. In other examples, the seat assembly 100 may form some other seating system, mechanism, device, or assembly such as a front seat assembly, an intermediate row seat assembly, and/or other seat apparatus. A seat assembly 100 may be used in conjunction with a passenger vehicle 116 (e.g., cars, vans, SUVs, trucks, buses, trains, boats, ships, planes, etc.), and may be utilized in any other situation or apparatus where seating is desired, such as homes, office buildings, warehouse facilities, theaters, stadiums, recreational vehicles, commercial vehicles/equipment, agricultural vehicles/equipment, and roller coasters, among others.

In embodiments, a seat assembly 100 may be disposed and/or secured within a vehicle interior 112 of a vehicle 116. The seat assembly 100 may be connected, secured, and/or coupled to a support portion or buck 114 of the vehicle 116. In some examples, the support portion or buck 114 may be abutting, connected, secured, and/or coupled to at least one vertical, rear facing surface of the seat assembly 100 and/or may be abutting, connected, secured, and/or coupled to at least one lateral surface of the seat assembly 100 facing the vehicle floor 116A. Connecting the seat assembly 100 to the support portion or buck 114 in this manner may facilitate a distribution of the forces acting thereon to other vehicle structures, which may allow the seat assembly 100 to withstand greater loads/forces.

With embodiments, a seat assembly 100 may have a seatback section 102 that may be formed by an upper seatback section 104 and a lower seatback section 106, and may have a seating section 108. The seat assembly 100 may include a first seat 120, a second seat 150, an intermediate section 110 disposed between the two seats 120, 150, and/or a carrier frame 190. While the exemplary illustrations of the seat assembly 100 herein are depicted and described with two seats 120, 150, a single intermediate section 110, and a single carrier frame 190, various embodiments of a seat assembly 100 may include any number of seats, intermediate sections, and/or carrier frames.

In embodiments, the first seat 120 and the second seat 150 may include a respective seat bottom 122, 152 on which a user may sit, a seatback 124, 154 against which a user may lean, such as when sitting on the seat bottom 122, 152, and/or a headrest 126, 156. The first seat 120 and the second seat 150 may, with examples, be substantially mirrored versions of each other relative to the intermediate section 110. Accordingly, embodiments of a first seat 120 and a second seat 150 are jointly described below. The first seat 120 and the second seat 150 are not limited to a mirrored configuration, and the first seat 120 and the second seat 150 (or any number of seats) may additionally and/or alternatively be structured identically or differently from one another.

With embodiments, the seat bottom 122, 152 may be disposed adjacent to and/or may be connected to a lower region of the seatback 124, 154. The seat bottom 122, 152 may extend in a similar direction of the vehicle floor 116A (e.g., in a direction substantially transverse to gravitational force). The firmness, position, and/or orientation of the seat bottom 122, 152 relative to the seatback 124, 154 or the vehicle floor 116A may be adjustable via an adjustment mechanism 122A, 152A, which may allow a user to customize the configuration of the seat bottom 122, 152. The seat bottom 122, 152 may be of a generally rectangular, square, or trapezoidal shape, among other shapes, and may include rounded corners and/or edges. In some examples, the seat bottom 122, 152 may include an inner seat bolster 128B, 158B and an outer seat bolster 128A, 158A which protrude therefrom (e.g., at an oblique angle), such as to guide a user to sit in a central region of the seat 120, 150 and/or to bias the user toward a designed seating position. The seat bolsters 128A, 128B, 158A, 158B may have a wing-shape and may be a separate component from the seat bottom 122, 152 or may be integrally formed with the seat bottom 122, 152. The seat bottom 122, 152 may be constructed or composed of one or more of a variety of materials, such as fabric, foam, plastic, injection foam-in-place materials, and/or others. The seat bottom 122, 152 may be any desired size and shape, and may be constructed from or composed of any desired material.

In embodiments, the headrest 126, 156 may be disposed adjacent to and/or be connected to an upper region of the seatback 124, 154 opposite the seat bottom 122, 152. The headrest 126, 156 may include a body against which the head of a user may rest and an attachment mechanism 126A, 156A via which the headrest 126, 156 may be connected to the seat assembly 100. The attachment mechanism 126A, 156A may, for example, include any system or structure connecting the headrest 126, 156 to the seat assembly 100, such as a mount or a male-female connector, and may be actuatable such that a user may adjust the position of the headrest 126, 156 for comfort. In examples, the attachment mechanism 126A, 156A may connect the headrest 126, 156 directly to the seatback 124, 154 or to another portion of the seat assembly 100. The headrest 126, 156 may be padded or cushioned to provide a comfortable surface for the head of a user. The headrest 126, 156 may be constructed or composed of materials such as fabric, foam, plastic, injection foam-in-place materials, and/or other materials. The headrest 126, 156 may have a generally trapezoidal shape with rounded corners and edges for comfort. The headrest 126, 156 may be sized to be at least slightly larger in one or more dimensions than the head of an average person. The headrest 126, 156 may be any desired size and shape, and may be constructed from or composed of any desired material. The size, shape, firmness, material, and/or other feature of the padded body may be configured to reduce the impact/force exerted upon the head of a user in the event of rapid acceleration and/or deceleration, such as during an abrupt stop and/or collision.

With embodiments, the firmness, position, and/or orientation of the seatback 124, 154 relative to the seat bottom 122, 152 or the vehicle floor 116A may be adjustable via an adjustment mechanism 124A, 154A (see, e.g., FIG. 2), which may allow a user to customize the configuration of the seatback 124, 154. The seatback 124, 154 may include a seatback upper portion 130, 160, a seatback lower portion 132, 162, and/or at least one side bolster, such as an outer side bolster 134A, 164A and an inner side bolster 134B, 164B. The seatback upper portion 130, 160 may have a generally trapezoidal shape, while the seatback lower portion 132, 162 may have a generally rectangular and/or square shape. The seatback upper portion 130, 160 and/or the seatback lower portion 132, 162 may have rounded corners and edges for comfort. The seatback upper portion 130, 160 and the seatback lower portion 132, 162 may be constructed or composed of materials such as fabric, foam, plastic, injection foam-in-place materials, and/or other materials. The seatback upper portion 130, 160 and the seatback lower portion 132, 162 may be any desired size and shape, and may be constructed from or composed of any desired material.

In embodiments, the seatback upper portion 130, 160 may be adjustably connected to the carrier frame 190 and/or may be disposed adjacent to the seatback lower portion 132, 162. In examples, a bottom surface of the seatback upper portion 130, 160 may abut or lie at or about a top surface of the seatback lower portion 132, 162. The seatback upper portion 130, 160 and the seatback lower portion 132, 162 may be substantially aligned with one another laterally (e.g., may be centered at substantially the same position in the Y-direction) and/or in a movement direction extending between the front and rear of the vehicle 116 (e.g., the X-direction). Seams 136A, 166A of the seatback upper portion 130, 160 may be substantially aligned with the seams 136B, 166B of the seatback lower portion 132, 162 such that the seatback upper portion 130, 160 and the seatback lower portion 132, 162 appear to form a single component when assembled. A seatback upper portion 130, 160 may, for example and without limitation, be aligned directly over the seatback lower portion 132, 162 (e.g., may be centered at substantially the same position in the Z-direction) and together provide a substantially uniform seatback surface. The seatback upper portion 130, 160 and the seatback lower portion 132, 162 may each include a main portion 138, 140, 168, 170 and, in some examples, may also include a bolster 134A, 134B, 164A, 164B that may disposed on and/or connected to a side of the main portion 138, 140, 168, 170 (see, e.g., FIG. 2).

Figure 2:
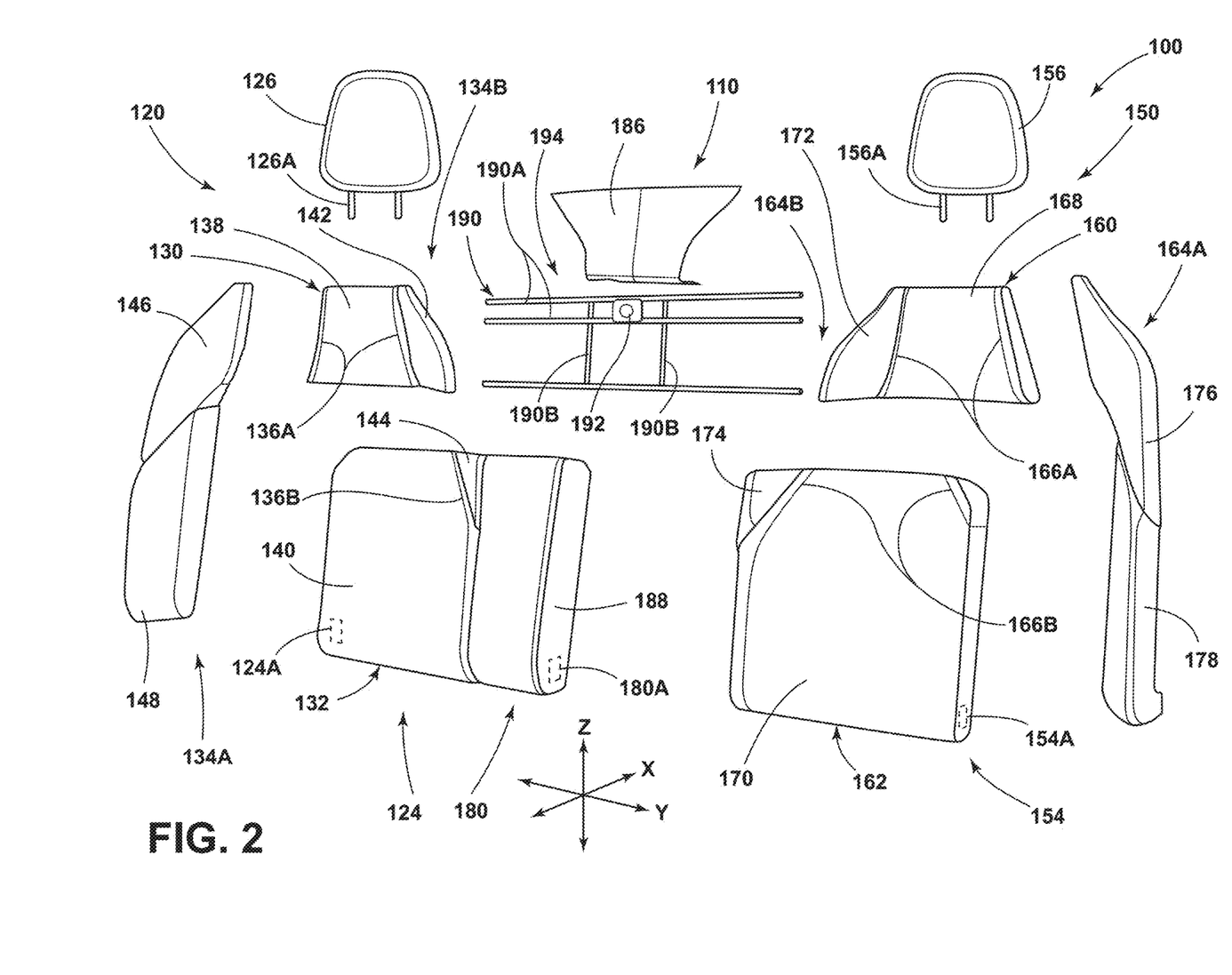
FIG. 2 generally illustrates an exploded view of an embodiment of a seat assembly according to teachings of the present disclosure.

In examples, the seatback 124, 154 may include one or both of an inner side bolster 134B, 164B that may be disposed on a side of the seatback 124, 154 adjacent to the intermediate section 110 and an outer side bolster 134A, 164A that may be disposed on a side of the seatback 124, 154 opposite the intermediate section 110. In examples, a seatback 124, 154 may include only an inner side bolster 134B, 164B, only an outer side bolster 134A, 164A, and/or may not include side bolsters at all. The inner side bolster 134B, 164B and the outer side bolster 134A, 164A may have a wing-like shape and/or may be disposed at an angle (e.g., an oblique or right angle) relative to the seatback upper portion 130, 160 and the seatback lower portion 132, 162. An angled wing-like shape of the inner side bolster 134B, 164B and the outer side bolster 134A, 164A may be configured to guide a user to sit in a central region of the seat 120, 150, may bias the user toward a proper seating position, and/or may limit movement of a user, at least to some degree. Side bolsters 134A, 134B, 164A, 164B may be structured with mirror symmetry relative to the center of the seatback 124, 154 (e.g., outer side bolster 134A, 164A may be a mirrored version of the inner side bolster 134B, 164B), such as generally illustrated in FIGS. 1 and 2 which may provide the user with substantially identical seating guidance and/or support on both sides. Mirror symmetry is not required and the outer side bolster 134A, 164A and/or the inner side bolster 134B, 164B may be shaped, sized, and arranged differently from one another. The outer side bolster 134A, 164A and/or the inner side bolster 134B, 164B may be constructed or composed of materials such as fabric, foam, plastic, injection foam-in-place materials, and/or other materials.

With examples, an outer side bolster 134A, 164A may be a separate component from the seatback upper portion 130, 160 and the seatback lower portion 132, 162, and an outer side bolster 134A, 164A may be connected to and/or disposed in abutment with a respective side of the seatback upper portion 130, 160 and the seatback lower portion 132, 162 opposite the intermediate section 110. An outer side bolster 134A, 164A may be structured as a single continuous component or may include a plurality of bolster portions, such as an upper outer bolster portion 146, 176 and/or a lower outer bolster portion 148, 178. The outer bolster portions 146, 148, 176, 178 may be aligned with one another, such as to collectively form and/or define the outer side bolster 134A, 164A. The outer side bolster 134A, 164A of a seat 120, 150 may be integrally formed with the seatback upper portion 130, 160 and the seatback lower portion 132, 162.

In examples, an inner side bolster 134B, 164B include an upper inner bolster portion 142, 172 and/or a lower inner bolster portion 144, 174. The inner side bolster 134B, 164B may or may not be integrally formed with the seatback 124, 154. For example and without limitation, an upper inner bolster portion 142, 172 may be integrally formed with a seatback upper portion 130, 160, and/or a lower inner bolster portion 144, 174 may be integrally formed with a seatback lower portion 132, 162. The upper inner bolster portion 142, 172 and the lower inner bolster portion 144, 174 may be aligned with one another, such as to form and/or define the inner side bolster 134B, 164B of the seatback 124, 154. Additionally and/or alternatively, the inner side bolster 134B, 164B may be a separate component from the seatback upper portion 130, 160 and the seatback lower portion 132, 162. In such examples, the inner side bolster 134B, 164B may be disposed adjacent to, connected to, and/or in abutment with a side of the main portion 138, 168 of the seatback upper portion 130, 160 adjacent to the intermediate section 110 and a side of the main portion 140, 170 of the seatback lower portion 132, 162 adjacent to the intermediate section 110.

With examples, an intermediate section 110 may disposed laterally (e.g., in the Y-direction) between the first seat 120 and the second seat 150. The intermediate section 110 may include an intermediate back section 180 and/or an intermediate seating section 182. Generally, the intermediate section 110 may divide or act as a spacer between the first seat 120 and the second seat 150. Additionally or alternatively, the intermediate section 110 may be structured to provide an additional seat between the first seat 120 and the second seat 150, wherein a user may sit on the intermediate seating section 182 and rest against the intermediate back section 180. In examples, the intermediate section 110 may include additional interactive structures 184 such as storage compartments, cup holders, entertainment modules, and/or controller modules, among others (see, e.g., FIG. 1). While the illustrative examples depicted in the figures include a single intermediate section 110, the seat assembly 100 may include any number of intermediate sections 110. In some examples, like those depicted in the figures, the seat assembly 100 may include a single intermediate section 110 which may be disposed laterally between two seats 120, 150. In other examples, multiple intermediate sections 110 may be disposed between two seats 120, 150 or no intermediate section 110 may be arranged between directly adjacent seats 120, 150. In examples including a plurality of seats 120, 150, one or more intermediate sections 110 may be disposed between at least some pairs of directly adjacent seats 120, 150 or between each set of directly adjacent seats 120, 150.

In examples, an intermediate seating section 182 may be disposed adjacent to and/or be connected to a lower region of the intermediate back section 180. Additionally, the intermediate seating section 182 may be disposed between the first seat bottom 122 and the second seat bottom 152. In some examples, the intermediate seating section 182 may be connected to and/or integrally formed with the first seat bottom 122 or the second seat bottom 152. Accordingly, the intermediate seating section 182 may be a separate, individual component or may be formed as a portion or part of another component. The intermediate seating section 182 may extend in a similar direction of the vehicle floor 116A and/or a seat bottom 122, 152 (e.g., in a direction transverse to gravitational force). The position, orientation, and/or firmness of the intermediate seating section 182 relative to the intermediate back section 180 and/or the vehicle floor 116A may be adjustable via an adjustment mechanism 182A (e.g., a latch, a lever, a recliner, etc.) that may allow a user to customize the configuration of the intermediate seating section 182. The intermediate seating section 182 may be sized and shaped in a manner complimentary to the first seat bottom 122 and/or the second seat bottom 152 such that the intermediate seating section 182 extends across and substantially fills a lateral distance therebetween. The upper surface of the intermediate seating section 182 may be disposed at a height equal to the height of the seat bottoms 122, 152 and/or may be disposed at least slightly above the seat bottoms 122, 152.

In examples of seat assemblies 100 that include seat bolsters 128A, 128B, 158A, 158B, the upper surface of the intermediate seating section 182 may have a height at least equal to the highest point of the inner seat bolsters 128B, 158B and extend laterally therebetween, such as generally illustrated in FIG. 1. The intermediate seating section 182 may, for example, be generally rectangular with rounded corners and edges, and may include a height complimentary to the first seat bottom 122 and the second seat bottom 152. The intermediate seating section 182 may be connected to and/or disposed in abutment with the laterally facing sides of the first seat bottom 122 and the second seat bottom 152. The intermediate seating section 182 may be constructed or composed of materials such as fabric, foam, plastic, injection foam-in-place materials, and/or other materials. The intermediate seating section 182 may be any desired size and shape, and may be constructed from or composed of any desired material. In some examples, the intermediate seating section 182 may include interactive structures 184 such as storage compartments, cup holders, entertainment modules, controller modules, etc. The interactive structures 184 may be disposed directly in a surface of the intermediate seating section 182, within a space defined within the intermediate seating section 182, and/or in any other desired manner.

With examples, the intermediate back section 180 of the intermediate section 110 may include an intermediate upper portion 186 and an intermediate lower portion 188. The intermediate back section 180 may be disposed adjacent to and/or be connected to a rear region of the intermediate seating section 182. In other examples, a bottom surface of the intermediate back section 180 may abut or lie against a top surface of the intermediate seating section 182. The intermediate back section 180 may extend in a similar direction of the first seatback 124 and/or the second seatback 154. The intermediate back section 180, the first seatback 124, and the second seatback 154 may be aligned with one another laterally (e.g., in the Y-direction) and/or in a movement direction (e.g., in the X-direction). The position, orientation, and/or firmness of the intermediate back section 180, or at least a portion of the intermediate back section 180, relative to the intermediate seating section 182 and/or the vehicle floor 116A may be adjustable via an adjustment mechanism 180A, which may allow a user to customize the configuration of the intermediate back section 180. In some examples, the intermediate back section 180 may include the interactive structures 184 such as storage compartments, cup holders, entertainment modules, controller modules, etc. The interactive structures 184 may be disposed directly in a surface of the intermediate back section 180, may be disposed within a space defined inside the intermediate back section 180, may include an actuatable console section that folds out from the intermediate back section 180 (e.g., a pivoting armrest section), and/or may configured in substantially any other desired manner. In some examples, the interactive structures 184 may be included in the intermediate lower portion 188.

In examples, the intermediate upper portion 186 may be connected to a carrier frame 190, such as laterally between the first seatback upper portion 130 and the second seatback upper portion 160. In some examples, the intermediate upper portion 186 may be connected to and/or disposed in abutment with the first seatback upper portion 130 and the second seatback upper portion 160. The intermediate upper portion 186 may be configured as an individual, standalone component. The intermediate upper portion 186 may be sized and shaped in a manner complimentary to the first seatback upper portion 130 and the second seatback upper portion 160 such that the intermediate upper portion 186 extends across and substantially fills the lateral distance therebetween. As generally illustrated in FIGS. 1 and 2, the intermediate upper portion 186 may, for example and without limitation, be of a generally trapezoidal shape complimentary to the first seatback upper portion 130 and the second seatback upper portion 160 with rounded corners and edges. The intermediate upper portion 186 may be constructed or composed of materials such as fabric, foam, plastic, injection foam-in-place materials, and/or other materials. In examples, the intermediate upper portion 186 may include a layer of fabric covering a body composed of a polyurethane plastic and/or a polypropylene plastic. The intermediate upper portion 186 may be any desired size and shape and may be constructed from or composed of any desired material.

With examples, the intermediate lower portion 188 may be disposed between the first seatback lower portion 132 and the second seatback lower portion 162 and may extend vertically between the intermediate seating section 182 and the intermediate upper portion 186. The intermediate lower portion 188 may be a separate, individual component or may be formed as a portion or part of another component. For example and without limitation, the intermediate lower portion 188 may be connected to and/or integrally formed with the first seatback lower portion 132 or the second seatback lower portion 162. The intermediate lower portion 188 may be sized and shaped in a manner complimentary to the first seatback lower portion 132 and the second seatback lower portion 162 such that the intermediate lower portion 188 extends across and substantially fills a lateral distance therebetween. Additionally or alternatively, the intermediate lower portion 188 may be sized and shaped in a manner complimentary to the intermediate seating section 182 and the intermediate upper portion 186 such that the intermediate lower portion 188 extends across and substantially fills a vertical distance therebetween. The intermediate lower portion 188 may, for example and without limitation, be of a generally rectangular shape with rounded corners and edges. The intermediate lower portion 188 may be connected to and/or in abutment with the laterally facing sides (e.g., facing in the Y-direction) of the first seatback lower portion 132 and the second seatback lower portion 162, as well as the vertically facing sides (e.g., facing in the Z-direction) of the intermediate seating section 182 and the intermediate upper portion 186. The intermediate lower portion 188 may be constructed or composed of materials such as fabric, foam, plastic, injection foam-in-place materials, and/or other materials. The intermediate lower portion 188 may be substantially any desired size and shape, and may be constructed from or composed of any desired material.

In embodiments, the carrier frame 190 may be disposed and/or disposed within a vehicle 116 and may be connected, secured, and/or coupled to a support portion or buck 114 of the vehicle 116. Additionally and/or alternatively, the carrier frame 190 may be connected to the upper seatback section 104 and/or the lower seatback section 106. The carrier frame 190 may be an elongated structure that may extend laterally into and/or behind the first seat 120, the second seat 150, and/or the intermediate section 110. In some examples, the carrier frame 190 may extend substantially in a region between the upper seatback section 104 and the lower seatback section 106. The carrier frame 190 may extend vertically beyond the upper seatback section 104 and/or the lower seatback section 106. In some examples, the carrier frame 190 may be disposed entirely above or entirely below the upper seatback section 104 and/or the lower seatback section 106. In other words, the carrier frame 190 may generally be disposed in a region of the upper end of the upper seatback section 104. As illustrated in the examples depicted in FIGS. 1 and 2, the carrier frame 190 may, for example and without limitation, have a rectangular shape with a plurality of laterally extending members 190A and a plurality of vertically extending members 190B that may form a grid-like structure. The carrier frame 190 may comprise metal, plastic, and/or composite material, among others.

With embodiments, the first seatback upper portion 130, the second seatback upper portion 160, and the intermediate upper portion 186 may be adjustably connected to the carrier frame 190. In some examples, the first seatback upper portion 130, the second seatback upper portion 160, and the intermediate upper portion 186 may be adjustably connected to the carrier frame 190 by a clip/clipped connection 192, a snap-on connection, and/or any other connection allowing for lateral adjustment (e.g., in the Y-direction) along the carrier frame 190. When connected to the carrier frame 190, the first seatback upper portion 130, the second seatback upper portion 160, and the intermediate upper portion 186 may slide or be adjusted laterally along the carrier frame 190, such as to facilitate proper lateral alignment with the corresponding lower portion 132, 162, 188.

In some examples, the carrier frame 190 may include a laterally extending sliding portion or track 194 to which the first seatback upper portion 130, the second seatback upper portion 160, and/or the intermediate upper portion 186 may be connected. In examples, such as generally illustrated in FIGS. 1 and 2, the track 194 may be configured as two laterally extending parallel members or bars 190A. The sliding portion or track 194 may be any other similar structure allowing for the lateral adjustment of the first seatback upper portion 130, intermediate upper portion 186, and/or the second seatback upper portion 160. The carrier frame 190 may facilitate connection of the first seatback upper portion 130, the second seatback upper portion 160, and/or the intermediate upper portion 186 to the support portion or buck 114 of the vehicle 116. Connecting portions 130, 160, 186 to the support portion or buck 114 via the carrier frame 190 may facilitate quick and easy alignment of the portions 130, 160, 186 with the corresponding lower portion 132, 162, 188 and/or may facilitate distribution of forces acting on the seat assembly 100 to other vehicle structures, which may allow the seat assembly 100 to withstand greater loads/forces.

With examples, the first seatback upper portion 130, the second seatback upper portion 160, and the intermediate upper portion 186 may be connected to the carrier frame 190, such as to form and/or define the upper seatback section 104 of the seat assembly 100. The first seatback lower portion 132, the second seatback lower portion 162, and the intermediate lower portion 188 may be connected together to form and/or define the lower seatback section 106. The upper seatback section 104 may be aligned with the lower seatback section 106. In some examples, the first seatback upper portion 130 may be aligned with the first seatback lower portion 132, the second seatback upper portion 160 may be aligned with the second seatback lower portion 162, and/or the intermediate upper portion 186 may be aligned with the intermediate lower portion 188. Once aligned (e.g., via the carrier frame 190), the aforementioned portions 130, 132, 160, 162, 186, 188 may be secured or fixed in position to form and/or define the seatback section 102 of the seat assembly 100. In some examples, the first seatback lower portion 132 and the second seatback lower portion 162 may each provide about 40% of a total width Tw of the lower seatback section 106, with the remaining portion (e.g., about 20%) provided by the intermediate lower portion 188.

Figure 3A:
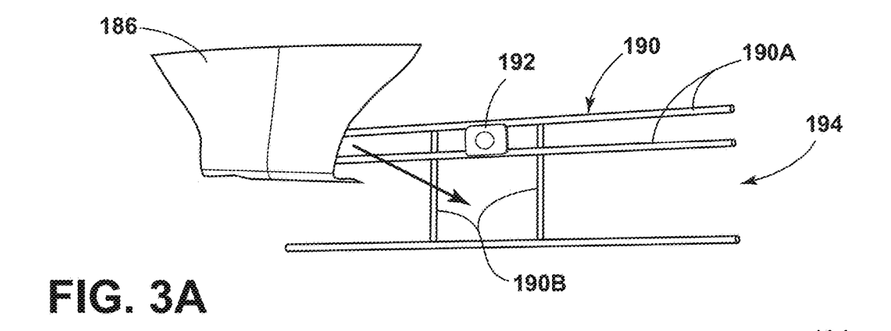
FIGS. 3A, 3B, and 3C generally illustrate an embodiment of a method of assembling a first seatback upper portion, a second seatback upper portion, and an intermediate upper portion on the carrier frame.
Figure 3B:
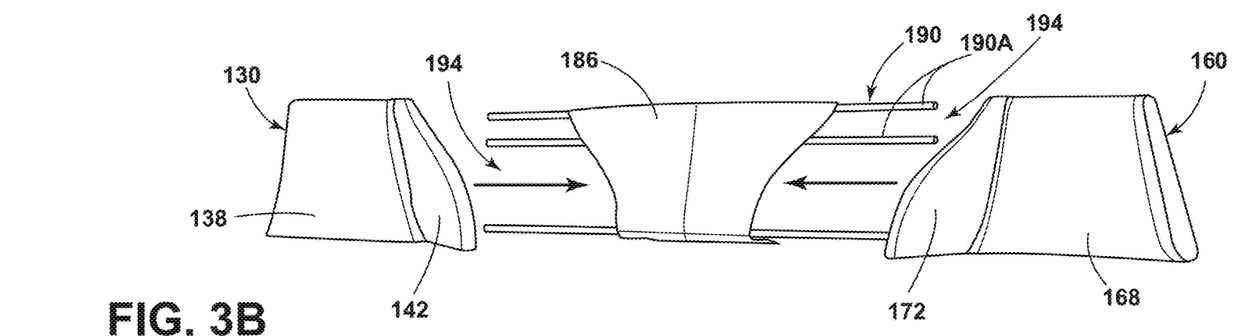
Figure 3C:
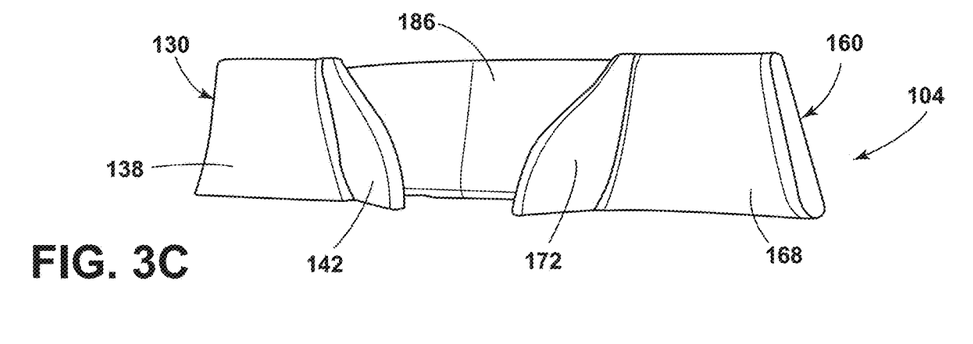

FIGS. 3A, 3B, 3C, 4A, 4B, and 4C generally illustrate an embodiment of a method of assembling a seat assembly 100. Referring now to FIG. 3A, the intermediate upper portion 186 may be connected to the carrier frame 190. The intermediate upper portion 186 may be adjustably connected to the carrier frame 190, such as by a clip/clipped connection 192, a snap-on connection, a connection allowing for lateral adjustment along the carrier frame 190, and/or another connection. In some examples, the intermediate upper portion 186 may be connected to a sliding portion or track 194 of the carrier frame 190. The intermediate upper portion 186 may be connected in a laterally central region of the carrier frame 190. Next, the first seatback upper portion 130 and the second seatback upper portion 160 may be connected to the carrier frame 190, such as generally illustrated in FIGS. 3B and 3C. Similar to the intermediate upper portion 186, the first seatback upper portion 130 and the second seatback upper portion 160 may be adjustably connected to the carrier frame 190, and/or may be connected to the track 194 of the carrier frame 190.

Figure 4A:
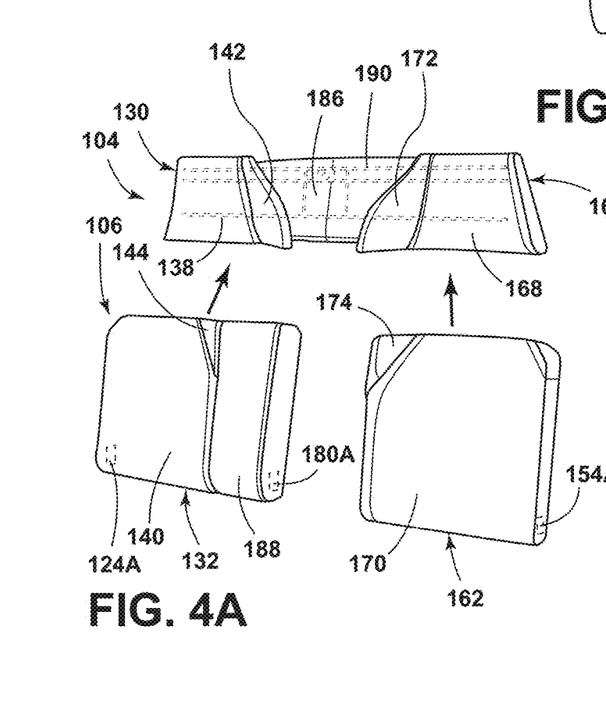
FIGS. 4A, 4B, and 4C generally illustrate an embodiment of a method of assembling an upper seatback portion, a first seatback lower portion, a second seatback lower portion, and an intermediate lower portion.

As generally illustrated in FIG. 4A, in examples, the first seatback lower portion 132, the second seatback lower portion 162, and the intermediate lower portion 188 are disposed proximate the carrier frame 190. While FIG. 4A shows this step occurring after the intermediate upper portion 186, the first seatback upper portion 130, and the second seatback upper portion 160 have been connected to the carrier frame 190, this is not required and may alternatively take place prior to or during the aforementioned process.

Prior to disposing the first seatback lower portion 132, the second seatback lower portion 162, and the intermediate lower portion 188 near the carrier frame 190, the intermediate lower portion 188 may be connected to one of the first seatback lower portion 132 or the second seatback lower portion 162. Connecting the intermediate lower portion 188 to the first seatback lower portion 132 or the second seatback lower portion 162 may include coupling, gluing, connecting to a common fastening element, and/or integrally forming the intermediate lower portion 188 with the first seatback lower portion 132 or the second seatback lower portion 162 (among other connection methods). In some examples, the intermediate lower portion 188 and the first seatback lower portion 132 or the second seatback lower portion 162 connected thereto may be disposed near the carrier frame 190 prior to the first seatback lower portion 132 or the second seatback lower portion 162 that is not connected to the intermediate lower portion 188.

Figure 4B:
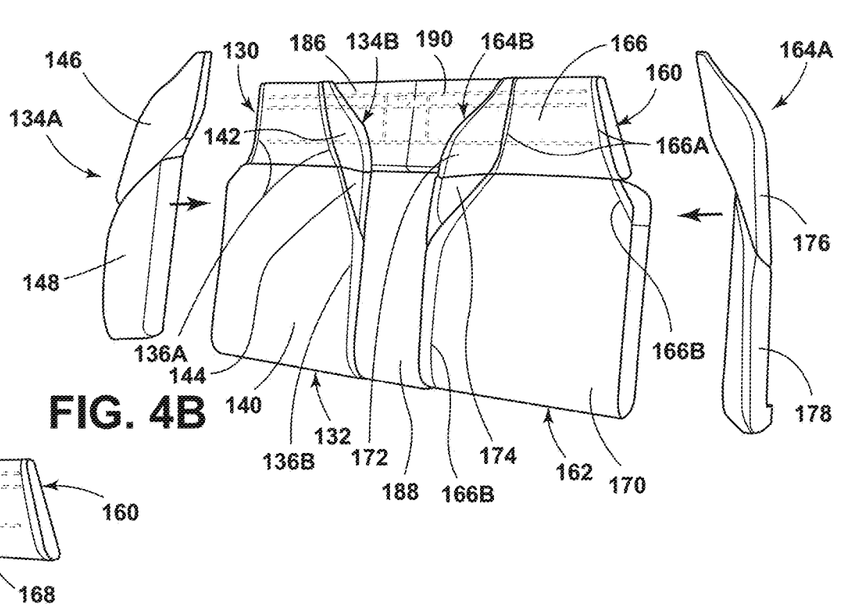

In embodiments, such as generally illustrated in FIG. 4B, after disposing the first seatback lower portion 132, the second seatback lower portion 162, and the intermediate lower portion 188 proximate the carrier frame 190, the side bolsters 134A, 134B, 164A, 164B may be aligned with and connected to the seatback upper portions 130, 160 and/or the seatback lower portions 132, 162. Alternatively, connecting the side bolsters 134A, 134B, 164A, 164B to the seatback upper portions 130, 160 and/or the seatback lower portions 132, 162 may occur prior to disposing the first seatback lower portion 132, the second seatback lower portion 162, and the intermediate lower portion 188 proximate the carrier frame 190. Connecting the side bolsters 134A, 134B, 164A, 154B may include connecting the outer side bolsters 134A, 164A and/or the inner side bolsters 134B, 164B to the seatback upper portions 130, 160 and/or the seatback lower portions 132, 162. In some examples, the side bolsters 134A, 134B of the first seat 120 may be connected the first seatback upper portion 130 and/or the first seatback lower portion 132 prior to, during, or after the side bolsters 164A, 164B of the second seat 150 are connected to the second seatback upper portion 160 and/or the second seatback lower portion 162. The outer side bolsters 134A, 164A and the inner side bolsters 134B, 164B of a respective seat 120, 150 may be connected to the seatback 124, 154 in any order, may be connected at the same time, and/or may be connected at different times. For example, the inner side bolsters 134B, 164B may be connected to seatback lower portion 132, 162 prior to the intermediate lower portion 188 being connected thereto. Where a side bolster 134A, 134B, 164A, 164B is formed by multiple portions, sections, components, etc., connecting the side bolsters 134A, 134B, 164A, 164B may further include aligning the various side bolster portions 142, 144, 146, 148, 172, 174, 176, 178 with one another to collectively form one or more of the side bolsters 134A, 134B, 164A, 164B. For example, the inner upper side bolster 142 may be substantially aligned with the inner lower side bolster 144 to form the inner side bolster 134B of the first seat 120, the outer upper side bolster 146 may be substantially aligned with the outer lower side bolster 148 to form the outer side bolster 134A of the first seat 120, the inner upper side bolster 172 may be substantially aligned with the inner lower side bolster 174 to form the inner side bolster 164B of the second seat 150, and/or the outer upper side bolster 176 may be substantially aligned with the outer lower side bolster 178 to form the outer side bolster 164A of the second seat 150.

Figure 4C:
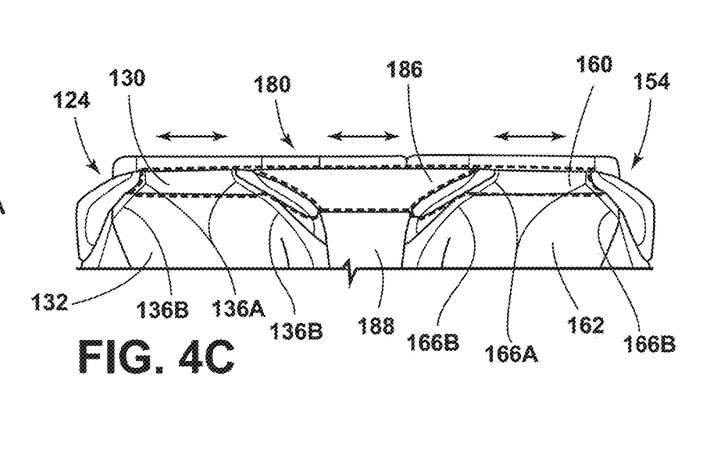

Next, in examples, the intermediate upper portion 186 may be laterally adjusted along the carrier frame 190, such as generally illustrated in FIG. 4C. This may include adjusting or sliding the intermediate upper portion 186 laterally along the track 194 of the carrier frame 190. The intermediate upper portion 186 may be adjusted to be substantially laterally aligned with the intermediate lower portion 188 to form the intermediate back section 180. Once aligned with the intermediate lower portion 188, the intermediate upper portion 186 may be secured and/or fixed relative to the carrier frame 190 and/or the intermediate lower portion 188.

With examples, the first seatback upper portion 130 may be laterally adjusted along the carrier frame 190 (e.g. after the intermediate back section 180 has been formed). This may include adjusting or sliding the first seatback upper portion 130 laterally along the track 194 of the carrier frame 190. The first seatback upper portion 130 may be adjusted to be substantially laterally aligned with the first seatback lower portion 132 to form the first seatback 124 of the first seat 120. Aligning the first seatback upper portion 130 may include aligning seams 136A of the first seatback upper portion 130 with seams 136B of the first seatback lower portion 132. Aligning the first seatback upper portion 130 may include aligning a bolster portion 142, 146 of the first seatback upper portion 130 with a bolster portion 144, 148 of the first seatback lower portion 132 to form a side bolster 134B, 134A of the first seat 120. Once aligned with the first seatback lower portion 132, the first seatback upper portion 130 may be secured and/or fixed relative to the carrier frame 190 and/or the first seatback lower portion 132.

In an analogous manner, the second seatback upper portion 160 may laterally adjusted along the carrier frame 190 (e.g., after the intermediate back section 180 has been formed). This may include adjusting or sliding the second seatback upper portion 160 laterally along the track 194 of the carrier frame 190. The second seatback upper portion 160 may be adjusted to be substantially laterally aligned with the second seatback lower portion 162 to form the second seatback 154 of the second seat 150. Aligning the second seatback upper portion 160 may include aligning seams 166A of the second seatback upper portion 160 with seams 166B of the second seatback lower portion 162. Aligning the second seatback upper portion 160 may include aligning a bolster portion 172, 176 of the second seatback upper portion 160 with a bolster portion 174, 178 of the second seatback lower portion 162 to form a side bolster 164B, 164A of the second seat 150. Once aligned with the second seatback lower portion 162, the second seatback upper portion 160 may be secured and/or fixed relative to the carrier frame 190 and/or the second seatback lower portion 162.

The method of assembling the seat assembly 100 may involve a vehicle 116 in some instances. In such situations, the method may further include inserting the carrier frame 190 within the vehicle 116. The carrier frame 190 may be inserted into the vehicle 116 after the intermediate upper portion 186, the first seatback upper portion 130, and the second seatback upper portion 160 have been connected. Alternatively, the carrier frame 190, the intermediate upper portion 186, the first seatback upper portion 130, and the second seatback upper portion 160 may be individually inserted into the vehicle 116 and connected together inside the vehicle 116. The carrier frame 190 may be inserted within the vehicle 116 with one or more of the intermediate upper portion 186, the first seatback upper portion 130, and the second seatback upper portion 160 connected thereto. Once inserted within the vehicle 116, the upper seatback section 104 (e.g., the carrier frame 190 and/or components connected thereto, such as portions 130, 142, 160, 172, 186) may be connected, secured, and/or coupled to the vehicle 116 and/or to the support portion or buck 114 of the vehicle 116.

In examples, the first seatback lower portion 132, the second seatback lower portion 162, and the intermediate lower portion 188 may be inserted within the vehicle 116, arranged proximate the carrier frame 190, and/or secured in position. While this step may occur after the carrier frame 190 has been connected to the vehicle 116 and the intermediate upper portion 186, the first seatback upper portion 130, and the second seatback upper portion 160 have been connected to the carrier frame 190, this is not required and may alternatively take place prior to or during any of the preceding steps. The side bolsters 134A, 134B, 164A, 164B may then be inserted into the vehicle 116, aligned with the seatback upper portions 130, 160 and/or the seatback lower portions 132, 162, and connected thereto.

With examples, after the lower portions 132, 162, 188 and the side bolsters 134A, 134B, 164A, 164B have been inserted into the vehicle 116 and connected together and/or to the buck 114, one or more adjustments to the seatback upper portion 130, 160 may be made. For example and without limitation, the intermediate upper portion 186 may be adjusted (e.g., laterally) relative to the carrier frame 190, the first seatback upper portion 130 may be adjusted (e.g., laterally) relative to the carrier frame 190, and/or the second seatback upper portion 160 may be adjusted (e.g., laterally) relative to the carrier frame 190, such as to provide proper alignment with the other components/portions. The portions 130, 160, 186 may then be fixed in place and/or may be adjusted and fixed in place sequentially (e.g., one may be adjusted and fixed before adjusting and fixing a second). The carrier frame 190 may facilitate such final adjustments, which may simplify assembly, expedite assembly, and/or provide additional tolerances (e.g., tolerance compensation). For example and without limitation, a seat assembly 100 may include a plurality of components/portions that may be assembled together and/or may include a modular configuration, and the carrier frame 190 may be configured to compensate for manufacturing tolerances of one or more the components/portions of the seat assembly 100, which may facilitate assembling the seat assembly 100 and/or improve the appearance of an assembled seat assembly 100.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

What is claimed is:

1. A seat assembly, comprising:
   a first seatback including a first seatback upper portion and a first seatback lower portion;
   a second seatback including a second seatback upper portion and a second seatback lower portion;
   an intermediate back section including an intermediate upper portion and an intermediate lower portion, the first seatback lower portion and the second seatback lower portion disposed at opposite sides of the intermediate lower portion; and
   a carrier frame to which the first seatback upper portion, the second seatback upper portion, and the intermediate upper portion are connected;
   wherein at least one of the first seatback upper portion, the second seatback upper portion, and the intermediate upper portion is adjustably connected to the carrier frame; and
   the first seatback upper portion and the first seatback lower portion are separate components.

2. The seat assembly according to claim 1, wherein:
   the first seatback lower portion, the second seatback lower portion, and the intermediate lower portion are connected together to define a lower seatback section;
   the carrier frame includes a substantially laterally extending sliding portion disposed at or about an upper end of the lower seatback section; and
   the sliding portion is configured to facilitate lateral adjustment of the first seatback upper portion, the intermediate upper portion, and/or the second seatback upper portion.

3. The seat assembly according to claim 1, wherein:
   the intermediate upper portion is substantially aligned with the intermediate lower portion;
   the first seatback upper portion is adjustable along the carrier frame to substantially align the first seatback upper portion with the first seatback lower portion; and
   the second seatback upper portion is adjustable along the carrier frame to substantially align the second seatback upper portion with the second seatback lower portion.

4. The seat assembly according to claim 1, including:
   at least one first side bolster contacting a side of the first seatback lower portion and contacting a side of the first seatback upper portion; and
   at least one second side bolster contacting a side of the second seatback lower portion and contacting a side of the second seatback upper portion;
   wherein the at least one first side bolster is configured as a separate component from the first seatback lower portion and the first seatback upper portion; and
   the at least one second side bolster is configured as a separate component from the second seatback lower portion and the second seatback upper portion.

5. The seat assembly according to claim 1, wherein:
   the first seatback includes a first inner side bolster contacting the intermediate lower portion and contacting the intermediate upper portion, the first inner side bolster including a portion of the first seatback upper portion and a portion of the first seatback lower portion; and the second seatback includes a second inner side bolster contacting the intermediate lower portion and contacting the intermediate upper portion, the second inner side bolster including a portion of the second seatback upper portion and a portion of the second seatback lower portion.

6. The seat assembly according to claim 1, including a headrest connected to the first seatback upper portion;
wherein the intermediate lower portion is coupled directly to one of the first seatback lower portion and the second seatback lower portion.

7. The seat assembly according to claim 1, wherein the intermediate upper portion is connected to the carrier frame via a clipped connection.

8. A method of assembling a seat assembly, comprising:
connecting a first seatback upper portion, a second seatback upper portion, and an intermediate upper portion to a carrier frame such that the intermediate upper portion is disposed at least partially between the first seatback upper portion and the second seatback upper portion;
substantially aligning the intermediate upper portion with an intermediate lower portion to form an intermediate back section;
substantially aligning the first seatback upper portion with a first seatback lower portion to form a first seatback; and
substantially aligning the second seatback upper portion with a second seatback lower portion to form a second seatback;
wherein at least one of the first seatback upper portion, the second seatback upper portion, and the intermediate upper portion are adjustably connected to the carrier frame.

9. The method according to claim 8, wherein:
substantially aligning the first seatback upper portion with the first seatback lower portion includes substantially aligning seam lines of the first seatback upper portion with seam lines of the first seatback lower portion; and
substantially aligning the second seatback upper portion with the second seatback lower portion includes substantially aligning seam lines of the second seatback upper portion with seam lines of the second seatback lower portion.

10. The method according to claim 8, wherein at least one of:
substantially aligning the intermediate upper portion with the intermediate lower portion includes adjusting the intermediate upper portion along the carrier frame;
substantially aligning the first seatback upper portion with the first seatback lower portion includes adjusting the first seatback upper portion along the carrier frame; and/or
substantially aligning the second seatback upper portion with the second seatback lower portion includes adjusting the second seatback upper portion along the carrier frame.

11. The method according to claim 8, including:
connecting a first side bolster to at least one of i) a side of the first seatback lower portion and ii) a side of the first seatback upper portion; and
connecting a second side bolster to at least one of i) a side of the second seatback lower portion and ii) a side of the second seatback upper portion.

12. The method according to claim 8, including:
connecting, prior to substantially aligning the first seatback upper portion with the first seatback lower portion, a first outer side bolster to at least one of i) a side of the first seatback lower portion opposite the intermediate lower portion and ii) a side of the first seatback upper portion opposite the intermediate upper portion; and
connecting, prior to substantially aligning the second seatback upper portion with the second seatback lower portion, a second outer side bolster to at least one of i) a side of the second seatback lower portion opposite the intermediate lower portion and ii) a side of the second seatback upper portion opposite the intermediate upper portion.

13. The method according to claim 8, including:
connecting a first outer side bolster to at least one of i) a side of the first seatback lower portion opposite the intermediate lower portion and ii) a side of the first seatback upper portion opposite the intermediate upper portion; and
connecting a second outer side bolster to at least one of i) a side of the second seatback lower portion opposite the intermediate lower portion and ii) a side of the second seatback upper portion opposite the intermediate upper portion;
wherein substantially aligning the first seatback upper portion with the first seatback lower portion includes substantially aligning a bolster portion of the first seatback upper portion and a bolster portion of the first seatback lower portion to form a first inner side bolster which contacts the intermediate lower portion and the intermediate upper portion; and
wherein substantially aligning the second seatback upper portion with the second seatback lower portion includes substantially aligning a bolster portion of the second seatback upper portion and a bolster portion of the second seatback lower portion to form a second inner side bolster which contacts the intermediate lower portion and the intermediate upper portion.

14. The method according to claim 8, wherein connecting the intermediate upper portion to the carrier frame includes clipping the intermediate upper portion to the carrier frame.

15. The method according to claim 8, including connecting the intermediate lower portion to one of the first seatback lower portion and the second seatback lower portion.

16. The method according to claim 8, including:
inserting the carrier frame into a vehicle;
inserting the first seatback lower portion, the second seatback lower portion, and the intermediate lower portion into the vehicle; and
connecting, prior to inserting the first seatback lower portion, the second seatback lower portion, and the intermediate lower portion into the vehicle, the intermediate lower portion to one of i) the first seatback lower portion and ii) the second seatback lower portion.

17. The method according to claim 8, including:
inserting the carrier frame into a vehicle after connecting the first seatback upper portion, the second seatback upper portion, and the intermediate upper portion to the carrier frame; and
inserting the first seatback lower portion, the second seatback lower portion, and the intermediate lower portion into the vehicle prior to i) substantially aligning the intermediate upper portion with the intermediate lower portion, ii) substantially aligning the first seatback upper portion with the first seatback lower portion, and iii) substantially aligning the second seatback upper portion with the second seatback lower portion.

18. The seat assembly according to claim 1, wherein the carrier frame includes a substantially laterally extending track along which at least one of the first seatback upper portion, the second seatback upper portion, and the intermediate upper portion are adjustable in a lateral direction.

19. The seat assembly according to claim 1, wherein the carrier frame includes a plurality of members disposed in a grid structure.

20. A seat assembly, comprising:
- a first seatback including a first seatback upper portion and a first seatback lower portion;
- a second seatback including a second seatback upper portion and a second seatback lower portion;
- an intermediate back section including an intermediate upper portion and an intermediate lower portion, the first seatback lower portion and the second seatback lower portion disposed at opposite lateral sides of the intermediate lower portion; and
- a carrier frame to which the first seatback upper portion, the second seatback upper portion, and the intermediate upper portion are connected;
- wherein at least one of the first seatback upper portion, the second seatback upper portion, and the intermediate upper portion is configured to slide along the carrier frame.

* * * * *